March 27, 1962  G. E. KELLAR  3,027,135
DOUBLE DISC, BIDIRECTIONAL-FLOW GATE VALVE
Filed Nov. 10, 1959  3 Sheets-Sheet 1

INVENTOR:
GEORGE E. KELLAR
BY: RCRascher
ATTORNEY.

March 27, 1962  G. E. KELLAR  3,027,135
DOUBLE DISC, BIDIRECTIONAL-FLOW GATE VALVE
Filed Nov. 10, 1959  3 Sheets-Sheet 2

INVENTOR:
GEORGE E. KELLAR;
BY:
R C Raeche
ATTORNEY

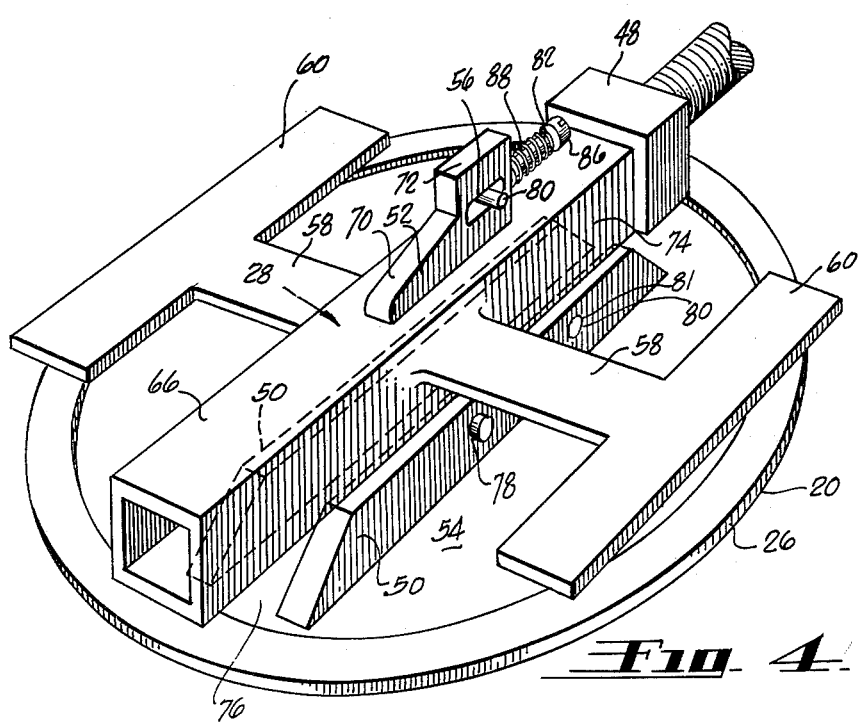
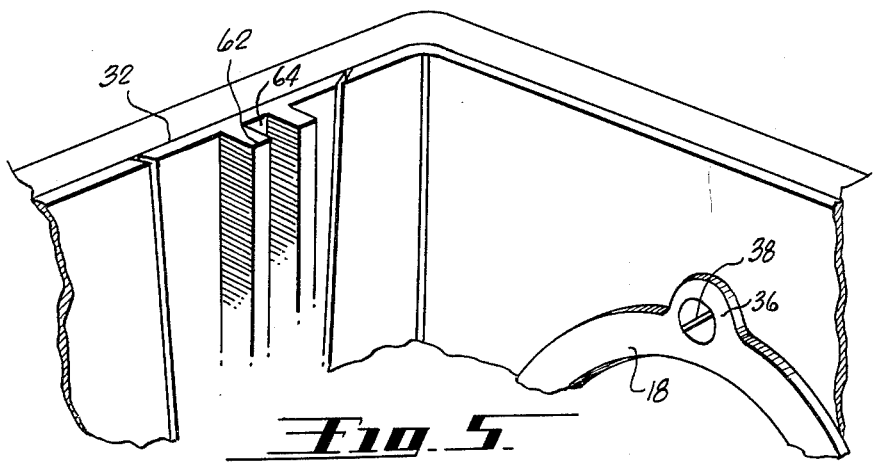
INVENTOR:
GEORGE E. KELLAR;
BY:
R C Raeche
ATTORNEY

United States Patent Office 3,027,135
Patented Mar. 27, 1962

3,027,135
DOUBLE DISC, BIDIRECTIONAL-FLOW
GATE VALVE
George E. Kellar, P.O. Box 132, Coachella, Calif.
Filed Nov. 10, 1959, Ser. No. 852,073
3 Claims. (Cl. 251—199)

This invention is concerned with gate valves, particularly gate valves for use in water works irrigation and other fluid distribution systems where high pressures are involved.

The invention is related to irrigation gate valves of the general type disclosed and patented in my U.S. Patent No. 2,793,002, entitled, "Gate Valve Construction," but advances and improves such valves in the particulars set forth hereinbelow.

My patented valve is intended for establishing and controlling flow therethrough in one and the same direction, only; that is, it is a unidirectional-flow valve. It receives the water or other fluid in a predetermined inlet-side when the single valve plate is lifted, and exits the water from a predetermined opposite outlet side. The valve is not intended for reverse flow, or, for receiving water or other fluid through the "outlet" side and controlling its exit through the "inlet" side.

However, in irrigation and always in water works systems it is not at all unlikely that the water in the external irrigation circuit will reverse its direction of flow and then subject the valve to back pressure, thus rendering the valve liable to have to serve as a bi-directional flow controller.

Among other advantages, the present valve is configured to control the flow of a liquid flowing therethrough in either direction.

Broadly to these ends, the present valve construction, like my patented one, includes a housing constructed in two portions, an upper, and a lower, portion. The lower portion includes a pair of spaced, oppositely disposed openings, each of which is adapted to function, on separate occasions, as an inlet opening and also as an outlet opening. Coaxially of each of these openings, on the inside of the housing is a valve-seat unit inset thereinto. Each of these units can be inserted thereinto and inset thereat and can also be removed as a double-unit, through the upper open end of the lower housing-portion, thus incorporating the same facile access feature for repair or replacement that is inherent in my patented valve although the present valve is adapted to certain additional usages and functions.

The frames and ring seats constituting these units are normally held in place by a pair of wedges, one for each unit. The wedges each have a pair of parallel guide strips that guide the movement of two movable valve members and the invention also incorporates a single bridge for the two valve members, said bridge being carried by the valve members. The valves are loosely connected to the bridge and move transversely of the seat to open or close the valve. At the terminal point of transverse motion of the valve members they come into contact with a stopping shoulder formed on a portion of the frame contained in the lower housing section. Carried on each valve member is an anti-friction abutment. Adjacent to and in contact with each abutment is a wedge-like portion of the bridge. At the terminal point of transverse motion of the valves, the bridge continues to move relative to the valves for a short distance in the transverse direction. This continued motion of the bridge causes each of the wedge-like portions to bear against the adjacent abutment, inducing a component of motion of the valve toward the seats. In this way, the valve member is forced into precise, fluid-tight engagement with the seat.

Other features and advantages of the present invention will either be made manifest or will become apparent from the following description, taken in connection with the accompanying drawings, in which:

FIG. 3 is an enlarged horizontal median section of the gate valve of my invention;

FIG. 4 is an enlarged perspective view of one of the valve members mounted to the bridge, and FIG. 5 is an enlarged perspective view of a portion of the lower housing showing a portion of the valve seat unit.

Figure 1:
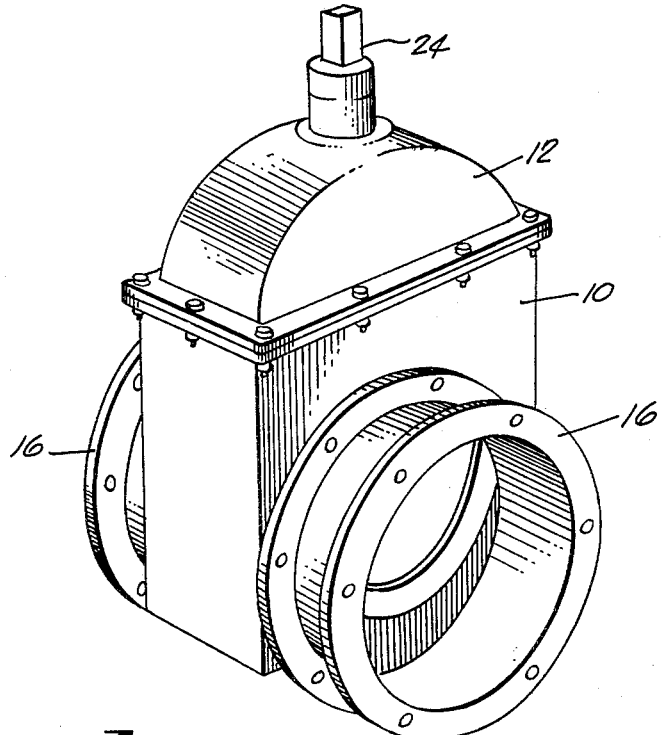
FIG. 1 is a perspective view of the two-section valve housing showing a typical attachment means for connecting the valve into a fluid carrying system.
Figure 2:
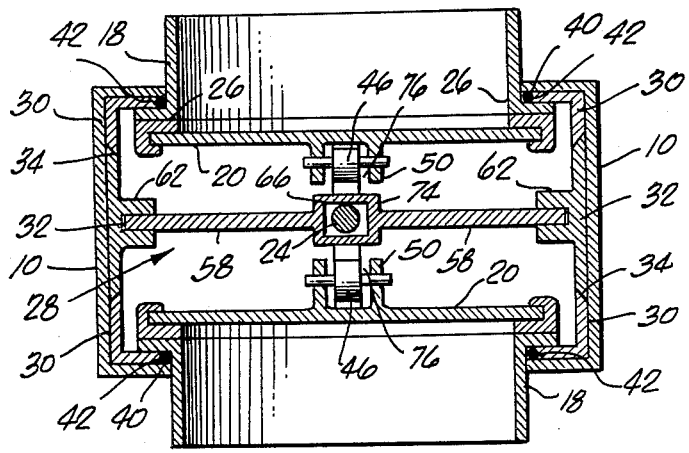
FIG. 2 is an enlarged vertical median section of the gate valve of my invention.
Figure 2:
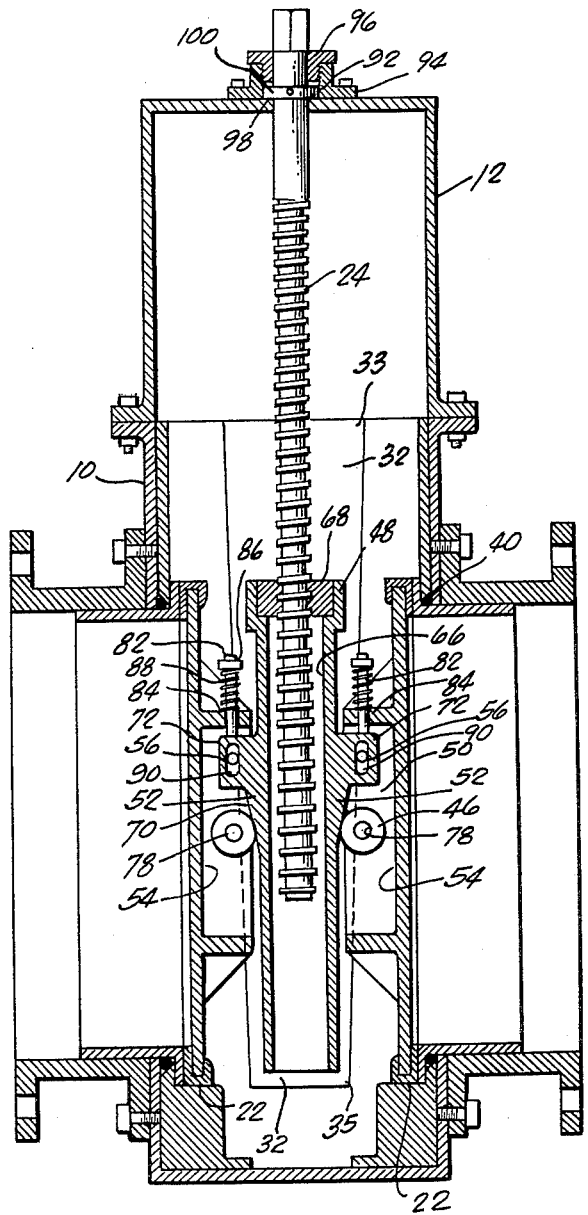

Referring now to FIGS. 1 and 2, the housing of the valve is made in two hollow parts which are bolted, or otherwise disengageably fastened, together. The principal section is lower section 10 to which upper section 12 is fastened by bolts, or otherwise fastened in some suitable manner. Lower housing section 10 has attached to it, or carries otherwise, two oppositely disposed or confronting and coaxial hub attachments 16. These attachments are fastened to the lower housing section by bolts or otherwise fastened in some suitable manner. While FIGS. 1 and 2 show a hub attachment, other attachment means, such as a bell mouth attachment for incorporating the valve in a "run" of concrete pipe, can be used as well. It is the function of the attachment member to receive and attach the valve into a hydraulic irrigation or petroleum line system; therefore any attachment member can be used which will achieve this result. The attachment members 16 each define an inlet or an outlet opening spaced apart at opposite sides of housing section 10, so that liquid can flow through the valve from either attachment to the opposite one.

The parts of the valve are contained within the enclosure formed by housing sections 10 and 12 and are, as a unit, bodily removable therefrom. As may be seen particularly in FIGS. 1 and 3, the walls of the housing sections are substantially vertical with respect to a horizontal plane passed through the housing at any point through its height. This is preferred in order that the valve interior parts may be quickly and easily placed in or removed from the housing substantially as a unit, as will be explained in greater detail hereinafter, without in any way breaking or interfering with the connections of either attachment member 16 to the hydraulic system. Assembly or disassembly of the interior parts of the valve relative to the housing is accomplished by vertical movements of these parts into or out of lower housing section 10 when the upper section 12 is removed. The bottom of the valve housing 12 is shown to be square. This comprises the preferred configuration; however, a valve housing 12 with a rounded bottom can be used equally as well.

The principal parts of the interior valve assembly are a pair of annular valve seat rings 18, dual valve closure members 20, which are raised or lowered by stem 24, bridge 28 which carries the valve members, and dual frame members 30 upon which the seat rings are mounted. Frame members 30 are locked in place inside the housing by side wedges 32.

The frame members 30 are substantially L-shaped in cross section and conform to the inside surface of the lower housing section 10. Each frame member 30 has one surface in contact with the inside surface of the lower housing section 10 over an area which begins just inward of the spaced inlet and outlet openings and extends approximately over one quarter of the width of the lower housing section. The portion of the frame members making contact, as described above, with the interior surface of the lower housing below the bottom point of the inlet and outlet openings has a pair of bearing surfaces 22 extending inwardly of the interior surface of the lower housing section. These bearing surfaces extend inwardly sufficiently to receive and sustain the downward terminal motion of the valve members 20. The surface of the frame members which makes contact with the ring seat are set at an angle. The surface of the frame below the inlet or outlet opening is of greater distance from the interior housing surface than is the corresponding surface above the openings. The slope of these surfaces is preferably one-eighth of an inch but need not be limited thereto since any similar slopes will function substantially as well. The sloping of these surfaces prevents drag of the valve members as they are opened or closed. Seat rings 18 are annular members having screw receiving ears 36 spaced around its periphery and are held in place on the frame members by a number of screws 38 (see FIG. 5), or by any other suitable fastening means. As shown by FIG. 3, valve seat rings 18 are of sufficient axial length to extend outward from the lower housing section through the inlet and outlet openings therein and each is surrounded on its back side by an annular gasket 40, preferably of rubber or similar elastic material, which bears against housing 10, and one edge 42 of the frame members to provide a water-tight joint between the seat ring, frame and housing. At one end rings 18 open into the adjoining mounting attachments 16 which thus affords an inlet and an outlet to the structure.

Dual frame member 30, rings 18, and gaskets 40, form a complete sub-assembly or unit, herein referred to as the "valve seat insert" or unit, that provides not only a replaceable valve seat but also means for forming a fluid-tight seal around the seat with the housing so that fluid flow is controlled by engagement of the valve members with the valve seats.

When in position within the housing, the valve seat inserts, each consisting of a frame, the seat rings, and a gasket, are held in place by two side wedges 32 which are interposed between the adjacent edges 34 of the frame members along the total exposed edges. On one side, each wedge 32 is in contact with the inside surface of the lower housing section. As can be seen in FIG. 2, the wedges 32 are tapered, with the surface of the wedge 32 that is in contact with the inside surface of the lower housing at the top of the housing having a larger dimension in cross section 33 than the corresponding cross section 35 at the bottom of the wedge. The edges of the wedges are bevelled and mate with the adjacent bevelled edge 34 of the frame member. When driven down into position shown in FIG. 5, the two side wedges 32 push against the frame members to force the valve insert assembly into operational position and compress gasket 40 against the wall of housing 10 and the wall of the ring seat in order to form a liquid-tight seal therewith.

The wedges 32 have two parallel guide strips 62 at the center of the wedges to guide the movement of the bridge carrying the valve members. The strips are parallel with the longitudinal axis of the housing and extend along the length of the wedges sufficiently to provide a means to guide the motion of the bridge and valve members parallel to said longitudinal axis.

Referring now to FIG. 4, the movable valve members or plates or closures 20 are disc shaped having a removable bearing surface mounted on them providing a fluid-tight joint when the bearing surface 26 makes contact with the annular seats on the outer end of the rings 18. The removable bearing surfaces extend radially inward from the disc periphery sufficiently to make a complete contact with the annular seats and also extend over the disc edge into contact with the non-fluid bearing face 54 of the valve members sufficiently to mount the bearing surface on the disc. The bearing surface 26 is composed of a material such as bronze that will insure a good seat of the valve upon the ring seat 18 but with enough flexibility to allow the bearing surface to be readily removed from the disc and replaced.

On the non-fluid bearing face 54 of each of the valve members is a pair of spaced apart ribs 50. The ribs are of sufficient length to receive and mount the valve members to the bridge member 28 as well as the abutment 46, (to be described later). The bridge member comprises a hollow chamber 66 having a longitudinal dimension substantially equal to the diameter of the valve disc. At the top of the hollow chamber is a housing 48 for a non-rotatable nut 68, and substantially centrally of the chamber are two tapered wedges 52 extending outwardly therefrom. The tapered wedges are on opposite sides of the chamber and extend into the mounting ribs 50 contained on the valve discs. The tapered surface 70 of the wedges are inclined to the plane of the seat and terminate in a portion 72 that extends outwardly from the chamber said portion contains a slot 56 and is elongated in a plane parallel to plane of the ring seat. Extending outwardly from the other pair 74 of opposite chamber faces and right angle to the wedges, are two wings 58. These wings terminate in an elongated section 60 which is engaged in the groove 64 on the side wedges 32 formed between the parallel guide strips 62.

At the center of the valve members and perpendicular with the longitudinal axis of the ribs 50 are pin receiving apertures. Mounted within the groove 76 between the ribs and contained by a pin 78 inserted through said apertures is an anti-friction abutment member 46. The abutments are typically rollers for engagement with the inclined surfaces 70 on the wedges 52 in order to impart to the valve members a component of motion substantially perpendicular to the plane of the seat as a consequence of engagement of rollers with the wedges. The force of the wedges bearing against the abutments will be substantially at the center of the valve member because the abutments are mounted at the center of the disc. This imparts a uniform motion to the valve as it closes. The valve members are mounted on the bridge by pins 80 inserted through the elongated groove 56 and terminating in apertures 81 in the parallel ribs.

A spring retention stem 82 extends upward from one end of the tapered wedge 52 containing the elongated slot 56 parallel with the plane of the seat through an aperture in a transverse section 84 of the ribs. Coaxial of the stem, and terminating with one edge restrained by a nut 86 threaded on the outer extremity of the stem 82 and the other edge restrained by the forward surface of the transverse section 84 of the rib, is a compression non-corrosive spring 88. The springs carry the weight of the disc, preventing the wedges on the bridge from functioning until the valve members contact the stopping shoulders of the dual frame members. Because of the loose mounting of the valve members to the bridge, the mounting pin 80 will bear against the bottom 90 of the elongated slot under the force of the weight of the disc. However, instead of pulling the wedge into contact with an abutment and producing a motion of the valve perpendicular to the valve seat, such motion is retarded by the spring 88 until the valve is aligned with the valve seat.

The motion of the bridge and valve members parallel to the plane of the seat and guided by the parallel guides on the wedges is imparted to the bridge and valve member combination by the stem 24.

Stem 24 is threaded, preferably with a coarse, fast thread, and is threaded into nut 68 which is loosely but non-rotatably mounted in a housing 48 at the top of said bridge. Above the threaded portion, stem 24 has a collar 92 which is preferably formed integrally with the rest of the stem, but which alternatively may be pinned or otherwise attached to the stem. Collar 92 is confined between the shoulder or web on cap 94 and a similar shoulder or web on valve housing 12. The cap 94 is bolted to the upper portion 12 of the valve housing and has a gasket preferably interposed between the cap and housing to obtain a water-tight joint. It has been found preferable to interpose a washer 98 between the underside of the collar and the bearing surface on housing 12 to reduce friction. In this way stem 24 is held against vertical movement relative to the valve housing so that rotation of the stem causes the bridge member to travel up or down on the threaded portion of the stem, according to the direction of rotation of the stem and carry with it the valve members. In this fashion stem 24 provides means for moving the valve member parallel to the plane of seat. A packing gland 100 consisting of a suitable packing about stem 24 and compressed by nut 96 threaded onto cap is provided to prevent loss of liquid around the stem.

Having described the construction of the improved valve, I shall now describe briefly the manner of assembling and operating it. Assuming that initially all of the parts are separate and outside the valve housing, the first step is to assemble the valve seat rings on the dual frame members. This is done by placing the annular seat ring 18 on the frame 30 so that the extended portion of the valve seat ring extends through the aperture in the frame member. The valve seat ring is rotated in place until the internally threaded aperture in the valve seat rings are aligned with like apertures in the frame. When this has been done, a conventional screw is threaded into the apertures, thus attaching the valve seat ring to the frame member. This procedure is followed in assembling of the valve seat ring on both of the dual frame members. When this has been done, a rubber gasket 40 is placed over the ring on that portion which projects rearwardly from the frame.

The valve seat units are lowered into the lower housing section individually. This is done by first removing the upper housing unit 12 which is normally in place to close the valve. As the valve seat units are inserted through the opening in the lower housing unit they are brought into axial alignment with the inlet and outlet openings in the lower housing unit. As this is accomplished, the stopping shoulder 22 of the valve members is in contact with the bottom of the valve seat unit. The unit is inserted into an inlet or outlet until the frame member makes contact with the inside of the lower housing unit and the rubber gasket is likewise in contact with the inside surfaces. After the dual valve seat units have been inserted and aligned in the above noted fashion, the side wedges 32 are positioned to permanently position the valve seat units within the lower housing section. This is done by sliding the side wedges down the inside surfaces of the housing section and into binding contact with the adjacent tapered edges of the frame members. The side wedges are inserted in this fashion until the frame members are forced tightly against the inside surface of the body thus compressing the gasket to make a tight seal.

This placing of the wedges and the corresponding positioning of the valve seat units provides a rigidly mounted interior surface in the lower housing section. Both of the abutting surfaces on the frame units and the binding wedges are inclined to the longitudinal axis of the valve. This provides not only a more efficient binding force, as the wedges are positioned, but also a better sealing of the point of intersection of the frame and the wedge. Since the interior of the valve will be exposed to the corrosive effect of the fluid that is introduced into the valve, it is important that as little of this fluid as feasible is allowed to penetrate the interior surface and contact the walls of the lower housing surfaces.

Next, the abutment rollers 46 are placed centrally within the grooves 76 contained between the ribs 50 and the movable valve members 20. The aperture in the roller is aligned with the central aperture in the rib members and a mounting pin 78 is inserted to rotatably mount the rollers to the movable valve members.

The dual valve members 20 are placed on the bridge member 28 so that the extended portion of the wedge 52 on the bridge extends into the groove 76 formed between the ribs on the valve members. The elongated slot 56 in the extended portions of the wedge 52 is aligned with the mounting apertures 81 in the rib members 50 and a mounting pin 80 is inserted therein. As the elongated aperture 56 is aligned with the mounting apertures in the members the spring retention stem 82 is inserted through an aperture in the rib transverse section 84. Subsequent to the insertion of the mounting pin, the retention spring 88 is inserted over the end of the stem 82 and is brought into contact with one surface of the rib transverse section by the threading of a conventional nut on the end of the stem.

Next, the removable bearing surface 26 is brought into contact with the fluid contacting face of the valve members so that a portion of the surface extends radially outward from the periphery of the valve seat members. This extended portion is rolled on the valve periphery and into contact with said periphery and the other face of the valve member. In this fashion it is possible to remove and replace the bearing surface on the valve members with a relatively simple and efficient procedure.

Lastly, the non-rotatable nut is inserted in a groove at the top of the bridge member.

This completes the assembly of the bridge and movable valve members and this combination is inserted through the opening in the top of the lower housing section until the bearing surfaces on the movable valve members are aligned axially with the inlet and outlet ports of the annular valve seat rings. Also, the bottom of the annular seat is in contact with the stopping shoulder 22 of the lower portion of the frame members. The final step in the complete assembly is to put in place the upper section of the housing. The housing section is prepared by inserting stem 24 in the opening in the top of the housing section and cap 94 is then bolted to the housing section. The packing contained within the cap is compressed by turning down the nut 96 to prevent leakage on the upper end of the valve stem. Packing material is placed between top and bottom body members. With cap 94 in place, the housing section is lowered in a way to cause stem 94 to enter the non-rotatable nut 68 mounted on the bridge member; and the stem is turned to thread the stem through the nut and lower the top housing section onto the lower section. Finally, the housing sections are secured by bolts. Now, rotation of stem 24 causes nut 68 to travel up and down on the stem and carry with it the bridge member and the movable valve members, since the stem is held against vertical movement by engagement of collar 94 with housing 12 housing cap 94.

After the valve unit has been assembled, the appropriate attachment members are secured to the housing by conventional mounting means so that the attachments are co-axial with the central axis of the inlet and outlet ports.

While the preferred embodiment of the valve has been shown and described to utilize a plurality of retention springs working in cooperation with the bridge and valve plates it should be understood that these constitute a refinement and are not necessary for the basic operation of the valve and therefore may be omitted if desired.

Although the now preferred embodiment and methods of the present invention have been illustrated and described it is to be understood that the invention need not be limited thereto for it is susceptible to changes in form, detail and application within the scope of the appended claims.

I claim:

1. In a valve of the character described, the combination comprising: a housing having spaced inlet and outlet openings through which fluid flows; a valve seat ring at each of said openings providing a plurality of annular valve seats; a pair of movable valve members vertically disposed within said housing cooperating with said seats to close said openings to fluid flow; a pair of spaced-apart frame members disposed in said housing and in contact therewith, each rigidly connected to the valve seat ring, said frame members being removable from the housing through an opening in one side thereof; a pair of wedge members each bearing against the adjacent edges of the spaced-apart frame members to hold said frame members in a rigid position, said wedge members having at their center, two parallel guide strips extending parallel to the longitudinal axis of the valve; a pair of abutments each mounted to, and carried centrally by, a valve member; a bridge member disposed coaxially about said longitudinal axis and having its ends engageable with the guides of the wedge members and having a pair of wedge portions each having an inclined surface engageable with one of said abutments to move the valve members against the valve seats; means loosely mounting said bridge member to said valve members; a threaded stem extending externally of said longitudinal axis into the housing member independently of said wedges to move the valve members in a first direction parallel to the plane of said opening upon rotation of the stem; said bridge member including a pair of valve-mounting apertures, a pair of pin members each engageable with one of said apertures for mounting the movable valve members to said bridge members, said aperture being elongated in a plane parallel to the longitudinal axis of said valve and adapted for movement of the bridge member in said first direction after the terminal motion of said valve members in said first direction when said valve is closed by rotation of said stem and for motion of said valve members in a second direction away from said seat rings and when said valve is opened by rotating said stem in a direction opposite to that direction necessary for closing said valve.

2. In a valve of the character described, the combination comprising: a housing having spaced inlet and outlet openings through which fluid flows; a valve seat ring at each of said openings providing a plurality of annular valve seats; a pair of movable valve members cooperating with said seats to close said openings to fluid flow; a pair of spaced apart, removably mounted frame members vertically disposed within said housing, each having rigidly mounted to it one of said valve seat rings, said frame members being removable from the housing through an opening at the top thereof; means rigidly positioning said frame members and valve seat rings within the housing, with the valve seat rings substantially in axial alignment with said openings; means for moving the valve members into and out of engagement with said seats; and a bridge member disposed co-axially about the longitudinal axis of the valve and loosely associated with the valve members for limited movement relative thereto for movement of the valve members in a first direction parallel to said longitudinal axis; said bridge member including a pair of valve-mounting apertures, a pair of pin members each engageable with one of said apertures for mounting the movable valve members to said bridge member, said aperture being elongated in a plane parallel to the longitudinal axis of said valve and adapted for movement of the bridge member in said first direction after the terminal motion of said valve members in said first direction when said valve is closed by rotation of said stem and for motion of a second valve member in said direction away from said seat rings when said valve is opened by rotating said stem in a direction opposite to that direction necessary for closing said valve.

3. In a valve of the character described, the combination comprising: a housing having spaced inlet and outlet openings through which fluid flows; a valve seat ring at each of said openings providing a plurality of annular valve seats; a pair of movable valve members cooperating with said seats to close said openings to fluid flow; a pair of spaced apart, removably mounted frame members vertically disposed within said housing, each rigidly connected to a valve seat ring, said frame members being removable from the housing through an opening at the top thereof; means positioning said frame members and valve seat rings within the housing, with the valve seat rings substantially in axial alignment with said openings; means fo rmoving the valve members into and out of engagement with said seats, said means including a pair of wedges and a pair of abutments each carried on one of the valve members and each engageable with one of the wedges to move a valve member against the valve seat; and a bridge member disposed co-axially about the longitudinal axis of the valve carrying said wedges and loosely connected to the valve members for limited movement relative thereto for movement of the valve members in a first direction parallel to said longitudinal axis; said bridge member including a pair of valve-mounting apertures, a pair of pin members each engageable with one of said apertures for mounting the movable valve members to said bridge member, said aperture being elongated in a plane parallel to the longitudinal axis of said valve and adapted for movement of the bridge member in said first direction after the terminal motion of said valve members in said first direction when said valve is closed by rotation of said stem and for motion of said valve members in a second direction away from said seat rings when said valve is opened by rotating said stem in a direction opposite to that direction necessary for closing said valve.

References Cited in the file of this patent

UNITED STATES PATENTS

| 2,204,142 | MacClatchie | June 11, 1940 |
| 2,793,002 | Kellar | May 21, 1957 |
| 2,868,495 | Lucas | Jan. 13, 1959 |
| 2,906,491 | Young | Sept. 29, 1959 |

FOREIGN PATENTS

| 2,451 | Great Britain | Feb. 3, 1893 |
| 23,576 | Great Britain | Oct. 23, 1896 |
| 8,985 | Great Britain | Apr. 29, 1899 |
| 1,094,888 | France | Dec. 15, 1954 |
| 781,794 | Great Britain | Aug. 28, 1957 |